E. REYNOLDS.
Machine for Cutting Nails.
No. 47,605.  Patented May 2, 1865.
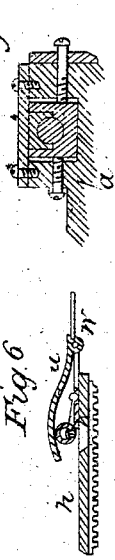
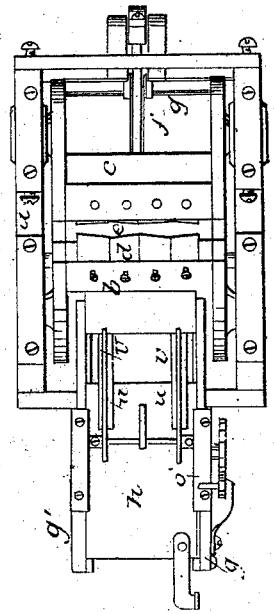
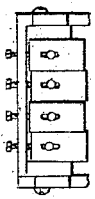
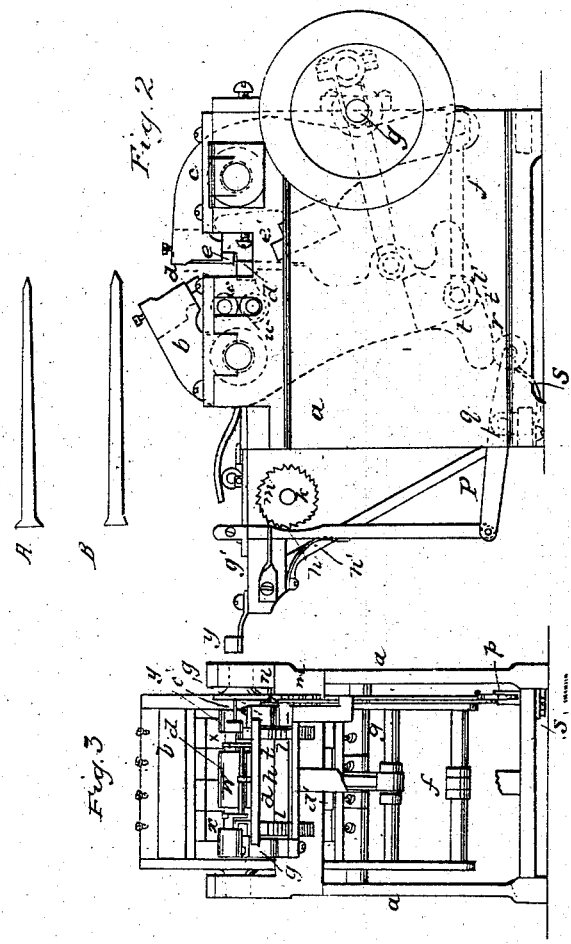
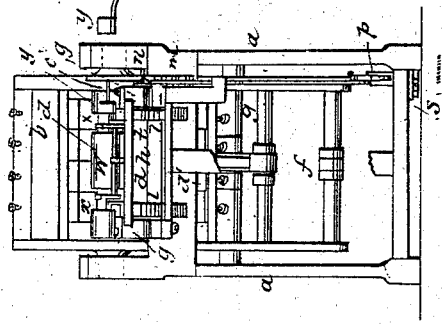
WITNESSES  
Francis Gould  
W. B. Gleason
INVENTOR  
Edwin Reynolds  
W. B. Crosby his atty

United States Patent Office.

EDWIN REYNOLDS, OF MANSFIELD, CONNECTICUT, ASSIGNOR TO HIMSELF, AND BENJAMIN GAGE, OF BOSTON, MASSACHUSETTS.

IMPROVED MACHINE FOR CUTTING NAILS.

Specification forming part of Letters Patent No. 47,605, dated May 2, 1865.

*To all whom it may concern:*

Be it known that I, EDWIN REYNOLDS, of Mansfield, county of Tolland, in the State of Connecticut, have invented an Improved Machine for Cutting Nails, &c.; and I do hereby declare that the following, taken in connection with the drawings which accompany and form part of this specification, is a description of my invention sufficient to enable those skilled in the art to practice it.

This invention relates specifically to the cutting of nails from plates of metal, though broadly it is applicable to other cutting mechanisms where the material is used to form "rights and lefts" or "heads and points," as in the manufacture of soles, tooth-picks, splints, &c.

In nail machinery it is well known that the practice is, generally, when a plate is used of a width corresponding to the length of nail to be manufactured, either to give the forward end of the plate a lateral movement at or after each operation of the cutting-die, by which the piece removed is alternately wide at one end and pointed at the other, and vice versa, or to turn the plate over, by which the same object is attained, and sometimes the cutter is vibrated instead of vibrating the plate. In machines which cut several nails at a time from the edge or end of the plate by a series of cutters placed in general line, the plate has sometimes a lateral movement a distance equal to the length of one or more nails to effect the alternate heading and pointing, and sometimes a vibrating movement is given to each cutter. By my invention, however, this lateral swinging movement of the nail-plate or vibration of the cutter or cutters is dispensed with, as is also the turning over the plate, no movement being given to it except the feed-movement, which causes it to progress forward the distance of the width of the nail for each movement of the cutting-dies, and a series nails being cut from the edge of the plate at each operation of the cutters.

My invention consists in the employment of two series of cutters or cutting-dies and two series of bed-dies, which act alternately upon the plate, cutting at each co-action of the cutter and bed-dies a series of nails from the edge of the nail-plate the whole width of the said plate and without any lateral or vibrating movement of the plate between the alternate operations of the opposite series of cutters, as will be hereinafter described.

The drawings show a machine embodying my invention, Figure 1 representing a plan of the same; Fig. 2, a side elevation, and Fig. 3 an end elevation, of it. Fig. 4 is a front view of one series of cutters; Fig. 5, an end view thereof. Fig. 6 shows a section of the nipper mechanism. Fig. 7 is a section of one of the journals of one of the oscillating frames.

$a$ denotes the frame-work of the machine, having mounted upon or within it two oscillating or rocking frames, $b$ $c$, one of which, $b$, carries two series of bed-dies, $d$ $d'$, and the other, $c$, two series of cutting-dies, $e$ $e'$, the cutting-die $e$ on one frame operating from above the path of movement of the plate in connection with the bed-die $d'$ upon the other frame operating from below the path of movement of the plate, and the cutter-die $e'$, below the plate and bed-die $d$ above it, co-operating in the same manner. A shaft on the opposite side of each oscillating frame is journaled in top of the frame $a$, as seen in the drawings, and the two frames $b$ $c$ are connected at their lower ends by a connecting-rod, $f$. A simultaneous rocking movement is communicated to the two frames from the main shaft $g$ by a connecting-rod and crank, as will be readily understood.

Projecting from the end of the machine are ways $g'$, which support a nipper-carriage, $h$, gears $i$, upon a shaft, $k$, meshing into toothed racks $l$ upon the under side of the carriage. The shaft $k$ carries a ratchet-wheel, $m$, into which a pawl, $n$, works, this pawl being upon or near the upper end of a rod, $o$, jointed at its lower end to a lever, $p$, as seen in Fig. 2. This lever turns on a fulcrum at $q$, and at its inner end has a friction-roll, $r$, which is held by a spring, $s$, against a cam-plate, $t$, on the lower end of one of the oscillating cutter-frames. The nippers consist of two levers, $u$, and plates $v$, acting together as tongs and grasping the plate, as will be readily understood from Fig. 6. The inner end of the nail-plate is guided and supported by rolls $w$, there being no stationary bed-die for supporting the plate. These rolls are grooved or cut away, as seen at $x$, to permit the nippers to pass between the rolls in feeding up the plate.

The operation of the machine is as follows: Suppose the parts to be in the position seen in Fig. 2 and a set of nails to have been just cut from the plate by the action of the cutters $e$ and bed-die $d'$. As the shaft $g$ rotates, the movement communicated to the rocking-frame $b\ c$ causes the descent of the bed-die $d'$ upon one frame and the ascent of the cutter $e$ of the other frame. Simultaneously the bed-die $d$ descends against the plate and the cutter $e'$ ascends and cuts off the nail. The cutting-faces of the two dies being the converse of the cutters $e\ d$, they cut the opposite side of each nail to the side left upon the plate by the previous coaction of the dies $d'\ e$, the plate having been fed forward after such action of the dies $d'\ e'$, and previous to the action of the dies $d\ e'$, and the cutting-faces of the dies $d\ e$, being the converse of the corresponding cutting-faces of the dies $d\ e'$. Thus it will be seen that at each rotation of the shaft $g$ two nails are cut by the two opposite dies of the two set of dies, and that as one set is cut in one direction and the other in the opposite direction rights and lefts or heads and points are cut without any movement of the nail-plate other than its progressive movement to the action of the dies. The cam-plate $t$ has two acting surfaces, $t'$. When the series of cutters are equidistant from the nail-plate, the roller $r$ is held by the spring $s$ in the depression in the cam-plate, causing the descent of the ratchet-pawl $n$, which, slipping over a tooth of the ratchet, is pressed under said tooth by the action of a spring, $n'$. As the lateral movement of the cam-plate continues and the cutters approach the nail-plate, one of the cam-surfaces $t'$ depresses the roll $r$ and elevates the pawl $n$, thus imparting rotation to the ratchet $m$ and gears $i$ and feeding forward the nipper-carriage and the nail-plate held thereby the width of a nail. This feed is of course effected before the cutters reach the plate, and as they are cutting the roll $r$ moves over a surface upon the cam-plate which is cut in the arc of a circle from its center of movement, thus producing no movement of the nail-plate during the cutting action of the cutters.

The forward movement of the nipper-carriage is automatically arrested when the plate has been all cut, as follows: A pin, $o'$, projects from the inner side of the rod $o$, and a catch, $y$, is fixed upon the nipper-carriage. This catch is in such position with respect to the nipper-carriage that when all of the nail-plate is fed through the machine the forward movement of the carriage brings the catch $y$ under the pin $o'$ and prevents descent of the rod $o$ and its pawl, and of course arrests the rotation of the ratchet and the feed of the nipper-carriage. The cutting-faces of each set of dies may be made adjustable with respect to each other by set-screws; but to adjust the co-operating cutting-edges of the opposite dies to each other I mount the journals of one cutter-frame in sliding boxes, as seen in Fig. 7, so that by means of adjusting-screws one cutter-frame may be moved toward or away from the other, the cutting-edges of both co-operating sets of dies being thereby adjusted, as will be readily understood, with respect to each other.

The machine, organized as shown in the drawings, with series of cutters for cutting several nails from a plate at each operation of the dies, can be employed for manufacturing nails of any form which can be cut from a plate without loss of material, such, for instance, as shown at A, or like that shown at B, which is an improvement upon A, in that the outer edges of the head do not terminate in points, but are cut square down from the head, as shown, making a stronger head with a better finish; or the common hook-headed brads or nails may be made.

I am aware that two sets or pairs of cutters, working alternately, have been before employed to manufacture nails, as in the Walter Hunt patent, of November 3, 1840, but each pair was composed of two single cutters, each of the length of one nail, and consequently but one nail was cut at each operation of the cutters.

I am also aware of the existence of machines having series of cutters so arranged as to cut several nails at each stroke from the edge of a plate, as in what is known as the "Wickersham Machine;" but in all such machines the nail-plate or the cutters have to have a lateral or a vibratory movement to cut nail heads and points.

In my machine, however, I accomplish two important results, namely: I cut a series of nails at each operation of the cutters, and I accomplish this without giving any lateral movement to the nail-plate; consequently I can cut a series of nails at each operation, which conjointly extend along the whole cutting-faces of the dies, whereas in the Wickersham machine two nails short of the whole length of the series of dies are cut at one operation. In a machine with cutters extending the length of ten nails I cut ten nails at a blow; whereas in the Wickersham machine the lateral movement of the plate causes only eight nails to be cut at one operation by the same number of cutters, so that by my construction I am enabled to cut ten hundred nails while eight hundred are being cut by the Wickersham construction, my machine cutting ten at each operation, and with the double series of cutters of course cutting twenty at each revolution of the drivingshaft to eight cut in the Wickersham machine.

I claim—

As my improvement in nail-cutting machines, their organization with two pairs of cutter-heads, each one of which carries two or more cutters, the whole being so arranged as to operate across the entire width of a sheet of metal to cut from the end thereof simultaneously two or more nails without giving to the nail-plate any other movement than its progression or feed.

In witness whereof I have hereunto set my hand this 14th day of January, A. D. 1865.

EDWIN REYNOLDS.

Witnesses:
J. B. CROSBY,
FRANCIS GOULD.